United States Patent [19]
Gillis et al.

[11] Patent Number: 5,118,459
[45] Date of Patent: Jun. 2, 1992

[54] MOULDING PROCESS

[75] Inventors: Herbert R. Gillis, Sterling Heights, Mich.; Malcolm Hannaby, Sterrebeek, Belgium

[73] Assignee: Imperial Chemical Industries PLC, England

[21] Appl. No.: 487,672

[22] Filed: Mar. 1, 1990

[30] Foreign Application Priority Data

Mar. 13, 1989 [GB] United Kingdom ............... 8905768

[51] Int. Cl.$^5$ .................... C08G 18/32; B28B 11/08
[52] U.S. Cl. ............................ 264/328.6; 528/370; 528/68
[58] Field of Search ............ 264/328.6; 528/370, 528/68

[56] References Cited

U.S. PATENT DOCUMENTS

| | | | |
|---|---|---|---|
| 3,215,668 | 11/1965 | Bissinger et al. | 260/47 |
| 4,100,116 | 6/1978 | Mazanek et al. | 528/64 |
| 4,794,129 | 12/1988 | Gillis, Jr. et al. | 252/182.13 |

FOREIGN PATENT DOCUMENTS 1397782  3/1965  France.
2337158  7/1977  France.

*Primary Examiner*—Jan H. Silbaugh
*Assistant Examiner*—A. Y. Ortiz

[57] ABSTRACT

A method of making a reaction injection moulded elastomer which includes injecting into a mould cavity a reaction mixture including:
(A) an organic polyisocyanate, and
(B) an isocyanate-reactive composition comprising the reaction product of:
  (a) the reaction product of a polyol or polythiol having an average hydroxyl or thiol functionality of from about 1.5 to about 6 and an average molecular weight of from about 100 to about 12,000 and an acylating agent, and
  (b) a polyfunctional compound which is capable of reacting with reactant (a) to provide a product containing a plurality of isocyanate-reactive groups.

6 Claims, No Drawings

MOULDING PROCESS

This invention relates to a moulding process and more particularly to a method of making reaction injection moulded elastomers.

The manufacture of isocyanate-based cellular or non-cellular elastomers is well established, one important production technique being that known as reaction injection moulding (RIM) whereby two highly reactive liquid streams are impingement mixed and rapidly injected into a mould cavity. The two streams generally comprise a polyisocyanate or derivative thereof, often known as the "A" component, and an isocyanate-reactive stream, known as the "B" component.

For the production of polyurethane based elastomers, the "B" component contains one or more polyols, for example polyoxypropylene polyols. However, the hydroxyl groups present in polyoxypropylene polyols are predominantly secondary in character and for some purposes it is desirable to use isocyanate-reactive compounds which have higher reactivity towards polyisocyanates. Thus, it is known to react these polyols with ethylene oxide to replace some of the secondary hydroxyls by primary hydroxyls but, even at high ethylene oxide usage, a significant proportion of the secondary groups remains.

Accordingly, other isocyanate-reactive materials which may be used in the "B" component include polyether polyamines obtained by the amination of the polyoxypropylene polyols. The polyamines are useful in the manufacture of high grade polyurea elastomers but are costly to make. Other valuable isocyanate-reactive materials for inclusion in the "B" component comprise the imino-functional compounds described in U.S. Pat. No. 4,794,129 but since many of these are prepared from the aforementioned polyamines, cost is again a disincentive.

It has now been found that high grade elastomers can be made by the RIM technique from isocyanate-reactive compositions which have high and controllable reactivities and are obtainable by relatively low cost methods.

Thus, according to the invention, there is provided a method of making a reaction injection moulded elastomer which comprises injecting into a mould cavity a reaction mixture comprising:
(A) an organic polyisocyanate, and
(B) an isocyanate-reactive composition comprising the reaction product of:
(a) an organic compound having the formula:

$$Q-[X-COY]_n$$

or $$Q-[X-CO-R-(COY)_m]_n$$

wherein Q represents an organic residue, X represents oxygen or sulphur, Y represents a halogen atom or an aryloxy group, R is a polyvalent hydrocarbon radical, m is a whole number from 1 to 3 and n is a whole number of at least 2, and
(b) a polyfunctional compound which is capable of reacting with reactant (a) to provide a product containing a plurality of isocyanate-reactive groups.

For reactant (a) used in the preparation of component (B), it is preferred that X is oxygen and Y is chlorine although Y can be any of the other halogens. Aryloxy groups which may be represented by Y include phenoxy and substituted phenoxy groups. The polyvalent hydrocarbon radical represented by R may be aliphatic, cycloaliphatic, aromatic or araliphatic and is preferably divalent or trivalent. The organic residue represented by Q is a polyvalent hydrocarbon residue which may optionally contain heteroatoms in the form, for example, of one or more ether, thioether, ester, thioester or amide groups.

Examples of organic compounds which may be employed as reactant (a) include acid chlorides such as may be obtained by reacting a carboxy terminated polyester with, for example, thionyl chloride.

It is preferred, however, that reactant (a) is the reaction product of a polyol or polythiol Q(XH)n having an average molecular weight of from about 100 to about 12,000 and an hydroxyl and/or thiol functionality of from about 2 to about 6, and an acylating agent of the formula:

$$COY_2$$

or $$R-(COY)_{m+1}$$

wherein Y, R and m have the meanings given above.

Polyols and polythiols which may be used in the preparation of reactant (a) preferably have hydroxyl functionalities of from 2 to 4. The polyols and polythiols may be of the types which find use as chain extenders or crosslinkers having molecular weights of, for example, from about 100 to about 1500 or they may be of the types which have been proposed as softblock components having molecular weights of, for example, from about 150 to about 8000.

Polyols are preferred to polythiols, especially polyols in which the hydroxyl groups are directly attached to aliphatic carbon atoms. Suitable polyols and methods for their preparation have been fully described in the prior art and, as examples of such polyols, there may be mentioned non-polymeric polyols, for example diethylene glycol, 1,6-hexanediol, cyclohexane dimethanol, bisphenol A, trimethylolpropane and pentaerythritol as well as polymeric polyols such as polyethers, polyesters, polyether-esters, polyesteramides, polythioethers, polycarbonates, polyacetals, polyolefins and polysiloxanes.

The preferred polymeric polyols are polyesters, polyether-esters and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds containing a plurality of active hydrogen atoms have been described in the prior art and include water and polyols, for example ethylene glycol, propylene glycol, diethylene glycol, cyclohexane dimethanol, resorcinol, bisphenol A, glycerol, trimethylolpropane, 1,2,6-hexanetriol, pentaerythritol, and amines, for example ammonia, ethylamine, methylamine, ethylene diamine, hexamethylenediamine, piperazine, diaminodiphenylmethane, diethylene triamine, ethanolamine, and the like. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and poly(iso-butylene) polyols. Suitable polysiloxane polyols include polydimethylsiloxane and polydiphenylsiloxane diols and triols.

Mixtures of polyols may be used. Such mixtures may contain components differing in respect of molecular weight, functionality and/or the chemical nature of the polymer backbone. Similarly, corresponding polythiols or polythiol mixtures may be used or mixtures of one or more polyols with one or more polythiols.

Acylating agents which may be reacted with polyols and/or polythiols to form reactant (a) include carbonyl dihalides, aryl haloformates, diaryl carbonates and the halides and aryl esters of polycarboxylic acids.

Preferred acylating agents comprise the carbonyl dihalides, especially phosgene. Other particularly useful acylating agents include dicarboxylic and/or tricarboxylic acid halides, especially chlorides, having boiling points not exceeding 350° C. at atmospheric pressure.

Reactant (a) may be formed by reacting the polyol or polythiol with the acylating agent under conventional acylation conditions. Thus, for example, a poly(chloroformate) may be formed by reacting a polyol, for example a polyether polyol such as a polyoxypropylene polyol, with phosgene, optionally in excess, and then removing the hydrogen chloride produced and any excess phosgene by sparging with dry nitrogen. Similarly, a poly(acid chloride) may be prepared by reacting a polyol with a volatile polycarboxylic acid chloride, optionally in excess, and then removing the hydrogen chloride by sparging with dry nitrogen. Unreacted polycarboxylic acid chloride may then be removed by distillation, preferably carried out under reduced pressure at a temperature below 250° C. These reactions have been fully described in the prior art.

Reactant (b) used in the preparation of component (B) may be a mono-imine or mono-enamine but is preferably a compound containing two or more functional groups per molecule selected from hydroxyl, thiol, primary amino, secondary amino, carboxy, imino and enamino groups. Imine and/or enamine containing compounds are most preferred.

Especially useful polyfunctional compounds have active hydrogen-containing and/or isocyanate-reactive groups of dissimilar reactivity, that is to say one of the groups is more reactive towards reactant (a) than another of said groups. As examples of such compounds, there may be mentioned compounds containing:

1) an amino group and or more hydroxyls, for example ethanolamine and diethanolamine;
2) a primary amino group and one or more secondary amino groups, for example N-methyl-1,6-hexanediamine and diethylene triamine;
3) an aliphatic amino group and one or more aromatic amino groups, for example p-aminobenzylamine;
4) an unhindered amino group and one or more sterically hindered amino groups, for example menthane diamine and isophorone diamine;
5) an amino, especially secondary amino, group and one or more enamino or hydrolytically stable imino-functional, for example compounds having the formulae:

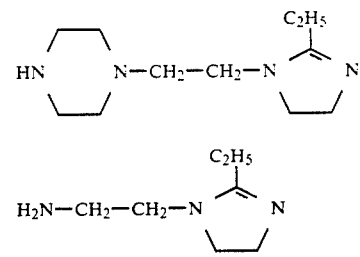

6) an amino, especially secondary amino group and one or more hydrolysable imino functional groups, for example compounds having the formulae:

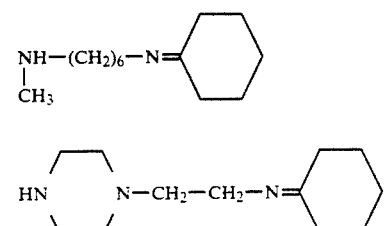

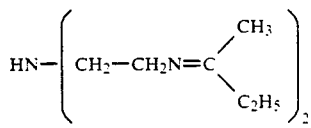

Of the above mentioned classes of compounds having active hydrogen groups of dissimilar reactivity, classes 5 and 6 are preferred. The use of symmetrical polyfunctional compounds having groups of equal reactivity, for example di-imines or di-enamines, is not excluded however. Mixtures of poly-functional compounds may be used if desired.

The imines or imino-functional compounds referred to herein are compounds which contain at least one isocyanate-reactive imino group per molecule and conform to the general structure:

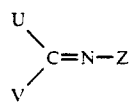

wherein U, V and Z are chemical moieties which collectively form the rest of said compound and are each independently selected from hydrogen and organic radicals which are attached to the imino unit:

said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through carbon and that U and V are independently H or organic radicals attached through C, N or O. It is most preferred that U, V and Z are attached through saturated atoms, preferably aliphatic carbon atoms.

Many types of imino-functional compounds are useful in this invention as reactant (b) including, but not limited to, those listed in Table A, following:

TABLE A

| TYPE | |
|---|---|
| $(P)-R^5-C(R^6)=N-R^7$ | Simple imine |
| $(P)-R^5-O-C(R^6)=N-R^7$ | Imino ester |
| $(P)-Ar-O-C(R^6)=N-R^7$ | Imino ester (aromatic) |
| $(P)-R^5-N=C(R^6)(R^7)$ | Simple imine |
| $(P)-R^5-NR^6-C(R^7)=N-R^8$ | Amidine |

TABLE A-continued

| TYPE | |
|---|---|
| $(P)-R^5-N=C(R^6)(Ar')$ | Simple imine (aromatic) |
| $(P)-R^5-NR^6-C(R^7)=N-Ar'$ | Amidine (aromatic) |
| $(P)-R^5-C(OR^7)=N-R^6$ | Imino ester (aliphatic) |
| $(P)-R^5-C(OAr')=N-R^6$ | Imino ester (aromatic) |
| $(P)-R^5-NH-C(NHR^6)=NR^6$ | Guanidine |
| $(P)-R^5-NR^7-C(NR^8_2)=NR^8$ | Guanidine |
| $(P)-R^5-NH-C(NHAr')=NAr'$ | Guanidine (aromatic) |
| $(P)-R^5-O-C(NHR^6)=N-R^6$ | Isourea |
| $(P)-R^5-O-C(NH_2)=N-R^7$ | Isourea | wherein:

$R^5$ and Ar are divalent aliphatic and aromatic organic linking groups, respectively;

(P) represents H or a polyether or hydrocarbon chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R_5$ may in particular be propylene, Ar methoxyphenylene, $R_6$ propyl, $R_7$ propyl, $R_8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature.

Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above. Alternatively alkylguanidines may be prepared by the reaction of an alkylamine salt with dicyandiamide as in E.A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analoqous thioimidates.

The preparation of acyclic imidates by the combination of an aliphatic or aromatic nitrile with an alcohol under acidic or basic conditions is described in F.C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds: The Pyrimidines, Supplement I", Ed. A. Weissberger and E. C. Taylor, author D. J. Brown, Interscience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

Examples of preferred imino-functional compounds include simple aldimines and ketimines such as may be obtained by reacting aldehydes, for example formaldehyde, acetaldehyde, propionaldehyde, n-butyraldehyde, isobutyraldehyde, heptaldehyde, alpha-methylvaleraldehyde, beta-methylvaleraldehyde, caproaldehyde, isocaproaldehyde, salicylaldehyde or cyclohexyl aldehyde and mixtures thereof, or ketones, for example acetone, methyl ethyl ketone, methyl n-propyl ketone, methyl isopropyl ketone, diethyl ketone, benzyl methyl ketone or cyclohexanone and mixtures thereof, with primary amines, especially aliphatic diamines including unsymmetrical diamines. Examples of suitable amines include hexamethylene diamine, menthane diamine, isophorone diamine, xylylene diamine, 2-methylpentamethylene diamine, polyoxyalkylene diamines and/or triamines having molecular weights up to about 600 and mixtures of such amines.

Enamine-containing compounds which may be used as reactant (b) in making component (B) include compounds having the structures:

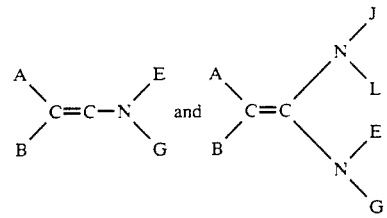

wherein each of A, B, D, E, G, J and L, independently, represents hydrogen or an optionally substituted organic radical, any of A, B and D and, independently, any of E, G, J and L optionally being joined together to form one or more carbocyclic or heterocyclic rings.

In preferred enamino-functional compounds, E, G, J and L are not hydrogen. Especially useful enamino-functional compounds contain two or three enamino groups as a result of A or B being a radical terminating in one or more enamino groups. Mono-enamino functional compounds may be used also.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, mixtures of these and the like with an aliphatic, cycloaliphatic, aromatic or heterocyclic secondary mono- or polyamine for example morpholine, piperazine or secondary amino-terminated low molecular weight polymers such as polyethers having molecular weights up to about 600.

General techniques for the synthesis of enamines have been described in, for example, Org. Coatings and Plastics Chem., 44, 151 and 157, (1981), ACS-PMSE preprints, August/September 1983, 456 and 461, and U.S. Pat. Nos. 4,342,841 and 4,552,945.

The polyfunctional compounds (b) used in the preparation of the isocyanate-reactive compositions (B) will generally have molecular weights below 5000, typically below 2000 and especially below 1000, for example below 600, and often below 300.

The isocyanate-reactive compositions used in the method of the invention may be formed by reacting reactant (a) with reactant (b) at ambient or elevated temperatures, optionally in the presence of an inert solvent and optionally in the presence of an acid acceptor. It is preferred to use a stoichiometric excess of the polyfunctional compound, that is to say more than one mole per equivalent of reactant (a). The unreacted polyfunctional compound may be removed at the end of the reaction by low pressure distillation, for example in a thin film evaporator or, alternatively, it may be allowed to remain in the isocyanate-reactive composition to function as a chain extender in subsequent reactions with organic polyisocyanates.

The preferred isocyanate-reactive compositions having imino or enamino functional groups may in particular be prepared by the controlled addition of reactant (a), optionally dissolved in a suitable inert solvent, to an appropriate reactant (b), optionally dissolved in a similar inert solvent. Reaction will generally proceed at or close to room temperature but temperatures in the range $-15°$ to about $100°$ C. may be employed if necessary to achieve a more controlled reaction.

Undesirable violent exotherms should be prevented by slow combination of the reactants, with additional cooling if required. The hydrogen chloride formed as a by-product can be removed by sparging the reaction product with dry nitrogen. Alternatively, proton scavengers such as tertiary amines or inorganic bases, for example calcium oxide or sodium carbonate, can be stirred into the reaction product and the resulting salts can be removed by filtration. Optionally the hydrochloride may be left in the product. Solvents can be removed from the reaction product by distillation, preferably under reduced pressure.

If desired, the isocyanate-reactive compositions used in the method of the invention may be blended with or employed in conjunction with other isocyanate-reactive materials which may be of the types which find use as chain extenders or crosslinkers having molecular weights of, for example, from about 60 to about 1500 or they may be of the types which have been proposed as softblock components having molecular weights of, for example, from about 1500 to about 8000.

Low molecular weight isocyanate-reactive compounds which may be mixed with the isocyanate-reactive compositions preferably have molecular weights below 500 and include glycols, for example ethylene glycol and 1,4-butanediol, alkanolamines, for example ethanolamine, diethanolamine, triethanolamine and tri-isopropanolamine and aromatic polyamines. Useful aromatic polyamines particularly include diamines, especially those having molecular weights between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,4-toluenediamine, 1,3,5-triethyl-2,6-diaminobenzene, 2,4-diaminotoluene, 2,6-diaminotoluene, 2,4'-diaminodiphenylmethane, 4,4'-diamino-diphenylmethane, 3,3'-dimethyl-5,5'-diethyl-4,4'-diaminodiphenylmethane, 3,3',5,5'-tetraisopropyl-4,4'-diaminodiphenylmethane and the like and mixtures thereof.

Higher molecular weight isocyanate-reactive compounds which may be mixed with the isocyanate-reactive compositions include polymeric polyols, for example those described above with reference to the production of reactant (a), especially the polyether and polyester polyols. Other higher molecular weight isocyanate-reactive compounds useful for mixing with the compositions include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation.

Polyoxypropylene diamines and triamines and mixtures thereof are preferred. Also useful are polymers containing both amino and hydroxyl groups obtained by the partial amination of polyols. Other suitable polyamines include amino functional polysiloxanes, amine terminated polyamides, amine terminated hydrocarbon, hydrocarbon polyols, etc.

Other isocyanate-reactive materials which may be mixed with the isocyanate-reactive compositions to form useful isocyanate-reactive blends include low or high molecular weight imino- or enamino-functional materials.

Organic polyisocyanates which may reacted with the isocyanate-reactive compositions in accordance with the method of the invention include aliphtic, cycloaliphatic and araliphatic polyisocyanates, for example hexamethylene diisocyanate, isophorone diisocyanate, cyclohexane-1,4-diisocyanate, dicyclohexylmethane-4,4'-di-isocyanate and p-xylylene diisocyanate. The preferred polyisocyanates, however, are the aromatic polyisocyanates, for example phenylene diisocyanates, tolylene diisocyantes, 1,5-naphthylene diisocyanate and especially the available MDI isomers, that is to say 4,4'-diphenylmethane diisocyanate, 2,4'-diphenylmethane diisocyanate and mixtures thereof.

Whilst diisocyanates are the preferred polyisocyantes for use in the preparation of the elastomers, mixtures of diisocyanates with minor proportions of higher functionality poly-isocyanates may be used if desired. Such mixtures include polymethylene polyphenyl polyisocyanates (crude MDI). Mention may also be made of polyisocyanates (especially MDI) which have been modified by the introduction of urethane, allophanate, urea, biuret, carbodiimide, uretonimine or isocyanurate residues.

Particularly useful polyisocyanates include liquid prepolymers containing both urethane and urea residues obtained by reacting a stoichiometric excess of an organic polyisocyanate, especially MDI, with:

(i) a polymeric polyol having a hydroxyl functionality of 2 to 4 and a hydroxyl equivalent weight of 500 to 5000, especially 800 to 2000, and
(ii) a polymeric polyamine having a primary and/or secondary amino functionality of 2 to 3 and an amine equivalent weight of 500 to 5000, especially 800 to 2000.

Reaction between the organic polyisocyanate and the isocyanate-reactive composition may be performed in the presence of reactive or non-reactive additives already described for use in reaction injection moulding processes. In addition to the chain extenders, crosslinkers and the like already mentioned, such additives include blowing agents, catalysts, surfactants, foam stabilisers, cell openers, fire retardants, fillers, dyes, pigments and internal mould release agents.

Blowing agents which may be used include water and inert volatile liquids which vaporise under the influence of the exothermic reaction, such liquids typically having boiling points not exceeding 100° C., preferably not exceeding 50° C., at atmospheric pressure.

Catalysts which may be used include tertiary amines such as 1,4-diazabicyclo(2.2.2)octane, N,N-dimethylethanolamine, bis(2-dimethylaminoethyl) ether, N-ethylmorpholine and N,N'-diethylpiperazine and tin compounds such as stannous octoate and dibutyltin dilaurate. Trimerisation catalysts include alkali metal salts of alkanoic acids and certain tertiary amines such as tris)-dialkylaminoalkyl)-hexahydro-triazines and tris(dialkylaminoalkyl)phenols.

Surfactants and foam stabilisers which may be used include oxyethylated alkylphenols, ethylene oxide-propylene oxide block copolymers and siloxane-oxyalkylene copolymers.

Fire retardants may be of the isocyanate-reactive or non-reactive types and fillers may be organic or inorganic, particulate or fibrous.

In formulating reaction systems for use in the method of the invention comprising:
A) an organic polyisocyanate;
B) an isocyanate-reactive component as hereinbefore described and,
C) one or more of the additives known per se in reaction injection moulding processes.

some of the individual components may be pre-blended if desired so as to reduce the number of component streams requiring to be brought together in the final mixing step. It is generally most convenient to formulate a two-stream system whereby one stream comprises the polyisocyanate and the second stream comprises the isocyanate-reactive materials. Inert additives are commonly included in the isocyanate-reactive stream but can often be incorporated with the polyisocyanate.

In operating the method of the invention, use may be made of any of the RIM techniques and equipment described in the prior art, for example in the aforementioned U.S. Pat. No. 4,794,129.

The isocyanate-reactive stream may advantageously contain an aromatic polyamine, for example the diamines mentioned above, as chain extender in addition to an isocyanate-reactive composition as described herein.

The invention is illustrated but not limited by the following Examples:

EXAMPLE 1

A polyoxypropylene triol of molecular weight 5000 was first dried and degassed by standing over 4A molecular sieves in a vacuum over at 35° C. overnight. The dried polyol (608.4 g, 0.116 moles) was transferred to a two litre three-necked round bottomed flask fitted with a mechanical stirrer, a dry ice cold finger, a gas addition tube and a nitrogen sparge tube. Phosgene (68.0 g, 0.687 moles) was carefully introduced into the stirred polyol at room temperature. After the phosgene addition was complete the stirred reaction mixture was slowly heated to 70° C. The reaction was held at this temperature for approximately two hours after which time analysis by infra red spectroscopy showed that all of the polyol had been converted to the required chloroformate. The cold finger was then detached and hydrochloric acid formed during reaction and excess phosgene were removed by sparging with dry nitrogen. The last traces of volatiles were removed by allowing the product to stand in a vacuum oven at 60° C. overnight. The product was used int he subsequent step without intermediate purification.

50 gram of the polyether chloroformate was slowly added via a dropping funnel to a vigorously stirred mixture of 100 g of the cyclohexanone bis-imine of Jeffamine D400 and 3.7 g triethylamine. An exotherm and the formation of a white precipitate was noted during the addition at room temperature.

The mixture was allowed to stir for a further hour after the addition of the chloroformate was complete. Cyclohexane solvent (50 g) was added and the mixture was filtered to remove triethylammonium chloride formed during the reaction. The solvent was then removed in vacuo to give a clear mobile resin having a viscosity of 940 cps at 23° C.

EXAMPLE 2

Applying the method described in Example 1, but using 50 g of the cyclohexanone bis-imine of Jeffamine D400, a resin was prepared having a viscosity of 1720 cps at 23° C.

EXAMPLE 3

Applying the method described in Example 1, but using 25 g of the cyclohexanone bis-imine of Jeffamine D400, a resin was prepared having a viscosity of 2460 cps at 23° C.

EXAMPLE 4

Applying the general method described in Example 1, 50 g of the polyether chlorformate was reacted with a mixture of 15 g of the cyclohexanone bis-imine of 2-methylpentane diamine (Dytek A from DUPONT) and 3.7 g triethylamine dissolved in 50 g cyclohexane solvent. A resin was obtained having a viscocity of 1400 cps at 23° C.

EXAMPLE 5

Applying the method described in Example 4, but using 15 g of the methylisobutylketone bis-imine of 2-methylpentanediamine (Dytek A from DUPONT) a resin was prepared having a viscosity of 3060 cps at 23° C.

EXAMPLE 6

Using the general method described in Example 1, a polyether chloroformate was made by reacting the polyether triol described in Example 1 with a 20% excess of phosgene. The product, after sparging with nitrogen, had an —OCOCl content of 4.60% by weight.

An isocyanate-reactive composition according to the invention was prepared by reacting the polyether chloroformate with N-methyl-N'-(2-methylpent-4-ylidine)-propylene-diamine (an amino-imine obtained by reacting methyl isobutyl ketone with N-methylpropylenediamine). Reaction between the chloroformate and the amino-imine was carried out in accordance with the following procedure:

The amino-imine (209 g, 1.25 moles), cyclohexane (6620 g) and triethylamine (125.3 g, 1.24 moles) were charged to a 20 l Buchi Chemreactor and stirred at 8670 rpm under a nitrogen blanket. By means of a well calibrated peristaltic pump, a solution of the chloroformate (2205 g, 1.223 moles) in cyclohexane (2205 g) was added to the amino-imine over a period of 60 minutes. The resulting reaction mixture was stirred for a further 30 minutes at which point 10% aqueous sodium hydroxide solution (1100 g) was added. After stirring for an additional period, agitation was ceased and the aqueous and organic layers were allowed to separate. The upper organic layer was subsequently washed a second time in the same manner. The solvent and residual water were then removed from the product by reduced pressure distillation at 45° C. and 30-50 mbar pressure.

The resulting milky white product had an amine value of 0.437 mmol/g and a viscosity of 1900 cP at 25° C.

EXAMPLE 7

Elastomers were prepared from formulations containing an isocyanate-terminated prepolymer, in imine-terminated isocyanate-reactive material and DETDA.

The prepolymer had an NCO content of 15.4% and was the product of reacting 44.26 parts by weight of an 80/20 mixture of 4,4'- and 2,4'-diphenylmethane diisocyanates, 10.0 parts by weight of a uretonimine-modified variant of pure 4,4'-diphenylmethane diisocyanate having an NCO content of 29.1%, 22.87 parts by weight of an ethylene oxide capped polyoxypropylene triol having an ethylene oxide content of approximately 15% by weight and a molecular weight of 5250 and 22.87 parts by weight of a polyoxypropylene diamine having a molecular weight of 2000, commercially available from Texaco Chemical Corporation as Jeffamine D-2000.

The isocyanate-reactive materials used in making the elastomers were two isocyanate-reactive compositions in accordance with the invention and, for the purpose of comparison, a polyether-imine of the type described in U.S. Pat. No. 4,794,129. Further details of these materials are as follows:

Polyether-imine. This was a tri-imine obtained by reacting cyclohexanone with Jeffamine T-5000 (a polyoxypropylene triamine having a molecular weight of 5000).

Composition 1. This was the composition of which the preparation is described in Example 6.

Composition 2. This was a composition obtained by reacting the polyether chloroformate described in Example 6 with an excess of the cyclohexanone bis-imine of 2-methylpentane diamine. The composition contained 90.8 parts by weight of chloroformate/imine reaction product and 9.2 parts by weight of free bis-imine.

The formulations were processed using the RIM technique. The prepolymer and isocyanate-reactive streams were injected at a temperature of 40°-45° C. and a pressure of 200 bar. RIM plaques were prepared as flat test sheets of dimensions 29.5 cm × 29.5 cm × 0.3 cm, the plaques being post-cured at 160° C. for 30 minutes within 24 hours of preparation.

Formulation details and elastomer properties are given in the following Tables.

TABLE 1

| SYSTEM | G1 | G2 | S1 | S2 |
|---|---|---|---|---|
| Prepolymer (pbw) | 60.7 | 62.8 | 60.4 | 62.6 |
| RESIN COMPOSITION: | | | | |
| Polyether-imine (pbw) | 21.6 | 20.5 | — | — |
| Composition 1 (pbw) | — | — | 21.8 | 20.6 |
| DETDA (pbw) | 17.7 | 16.7 | 17.8 | 16.8 |
| ISOCYANATE INDEX | 105 | 115 | 105 | 115 |
| HARDBLOCK CONTENT (%) | 51 | 51 | 51 | 51 |
| FLEXURAL MODULUS (MPa) | 658 | 660 | 865 | 803 |
| TENSILE STRENGTH (MPa) | 24.7 | 26.1 | 31.6 | 32.1 |
| ELONGATION (%) | 89 | 76 | 56 | 71 |
| HEAT SAG (mm) | 20 | 8.5 | 8 | 7 |
| (150 mm O/H, 160° C., 60 min.) | | | | |
| ROOM TEMP. IMPACT (J) | 59 | 52 | 39 | 47 |
| (FALLING DART) | | | | |
| −20° C. IMPACT (J) | 58 | 50 | 27 | 26 |
| (FALLING DART) | | | | |
| DENSITY (kg/m³) | 1127 | 1132 | 1111 | 1110 |
| HARDNESS (SHORE D) | 66 | 66 | 72 | 71 |

System G1 and G2 are included for the sake of comparison and do not represent the invention.

TABLE 2

| SYSTEM | S3 | S4 | S5 | S6 |
|---|---|---|---|---|
| Prepolymer (pbw) | 58.5 | 59.5 | 60.7 | 63.1 |
| RESIN COMPOSITION: | | | | |
| Composition 2 (pbw) | 25.9 | 24.6 | 22.8 | 19.2 |
| DETDA (pbw) | 15.6 | 15.9 | 16.5 | 17.7 |
| ISOCYANATE INDEX | 105 | 105 | 105 | 105 |
| HARDBLOCK CONTENT (%) | 50 | 51 | 52 | 54 |
| FLEXURAL MODULUS (MPa) | 657 | 708 | 708 | 661 |
| TENSILE STRENGTH (MPa) | 25.4 | 24.3 | 26.9 | 27.4 |
| HEAT SAG (mm) | 31 | 22 | 12 | 10 |
| (150 mm O/H, 160° C., 60 min.) | | | | |
| ROOM TEMP. IMPACT (J) | 49 | 50 | 52 | 35 |
| (FALLING DART) | | | | |
| −20° C. IMPACT (J) | 31 | 35 | 35 | 25 |
| (FALLING DART) | | | | |
| DENSITY (kg/m³) | 1113 | 1114 | 1112 | 1104 |
| HARDNESS (SHORE D) | 65 | 66 | 66 | 62 |
| ELONGATION (%) | 19 | 18 | 19 | 14 |

TABLE 3

| SYSTEM | S7 | S8 | S9 | S10 |
|---|---|---|---|---|
| Prepolymer (pbw) | 60.7 | 61.6 | 62.8 | 65.2 |
| RESIN COMPOSITION: | | | | |
| Composition 2 (pbw) | 24.6 | 23.2 | 21.6 | 18.1 |
| DETDA (pbw) | 14.7 | 15.2 | 15.6 | 16.7 |
| ISOCYANATE INDEX | 115 | 115 | 115 | 115 |
| HARDBLOCK CONTENT (%) | 50 | 51 | 52 | 54 |
| FLEXURAL MODULUS (MPa) | 622 | 657 | 656 | 635 |
| TENSILE STRENGTH (MPa) | 25.6 | 26.2 | 26.6 | 28.2 |
| HEAT SAG (mm) | 16 | 17 | 14 | 9 |
| (150 mm O/H, 160° C., 60 min.) | | | | |
| ROOM TEMP. IMPACT (J) | 54 | 60 | 46 | 59 |
| (FALLING DART) | | | | |
| −20° C. IMPACT (J) | 48 | 55 | 45 | 41 |
| (FALLING DART) | | | | |
| DENSITY (kg/m³) | 1119 | 1114 | 1114 | 1117 |
| HARDNESS (SHORE D) | 66 | 67 | 66 | 66 |

We claim:

1. A method of making a reaction injection molded elastomer which comprises injecting into a mold cavity a reaction mixture comprising:
   (A) an organic polyisocyanate, and (B) an isocyanate-reactive composition comprising the reaction product of:
  (a) the reaction product of a polyol or polythiol having an average hydroxyl or thiol functionality of from about 1.5 to about 6 and an average molecular weight of from about 100 to about 12,000 and an acylating agent of the formula:

$COY_2$ or $R-(COY)_{m-1}$ wherein Y represents a halogen atom or an aryloxy group, R is a polyvalent hydrocarbon radical, and m is a whole number from 1 to 3, and
  (b) a polyfunctional compound which is capable of reacting with reactant (a) to provide a product containing a plurality of isocyanate-reactive groups.

2. A method according to claim 1 wherein the polyol is a polyoxypropylene polyol.

3. A method according to claim 1 wherein the acylating agent is phosgene or a dicaboxylic acid chloride having a boiling point not exceeding 350° C. at atmospheric pressure.

4. A method according to claim 1 wherein reactant (b) contains two or more functional groups per molecule selected from hydroxyl, thiol, primary amino, secondary amino and carboxy.

5. A method according to claim 1 wherein reactant (b) contains at least one imino or enamino group.

6. A method according to claim 1 wherein reactant (b) has a molecular weight below 600.

* * * * *